United States Patent [19]

Shiraki

[11] Patent Number: 5,064,217
[45] Date of Patent: Nov. 12, 1991

[54] COVER FOR AIR BAG UNIT

[75] Inventor: Kouji Shiraki, Gifu, Japan

[73] Assignee: Toyoda Gosei Co., Ltd., Nishikasugai, Japan

[21] Appl. No.: 558,433

[22] Filed: Jul. 27, 1990

[30] Foreign Application Priority Data

Aug. 8, 1989 [JP] Japan .................. 1-93064[U]

[51] Int. Cl.⁵ .............................................. B60R 21/20
[52] U.S. Cl. ..................................... 280/743; 280/731
[58] Field of Search .................... 280/731, 732, 743

[56] References Cited

U.S. PATENT DOCUMENTS

| 4,334,699 | 6/1982 | Patzelt et al. | 280/731 |
| 4,836,576 | 6/1989 | Werner et al. | 280/731 |
| 4,852,907 | 8/1989 | Shiraki et al. | 280/731 |
| 4,878,689 | 11/1989 | Mitzkus et al. | 280/731 |

FOREIGN PATENT DOCUMENTS 64-44861 3/1989 Japan .

Primary Examiner—Kenneth R. Rice
Attorney, Agent, or Firm—Cushman, Darby & Cushman

[57] ABSTRACT

A cover for an inflatable air bag is provided which has an upper portion adapted to break upon inflation of the air bag and a side portion which extends downwardly from the peripheral edge of the upper portion. An insert is embedded in the cover and includes a flexible net and a flexiblle reinforcing band assembly. The net includes a side portion embedded in the side portion of the cover and upper portions which are embedded in upper portions of the cover. Coupling portions vertically couple the side portion of the net to the upper portions thereof. The reinforcing band assembly includes a horizontal band which is coupled by for example sewing to the side portion of the net along the entire perimeter of the side portion of the net and vertical bands which are sewn to the horizontal band and to the side edges of the upper portion and/or the coupling portions of the net. The vertical bands of the reinforcing band assembly are bent back at their lower ends so that the lower portions surround the horizontal band are are connected thereto. Since the vertical bands are wrapped around and sewn to the horizontal band, forces which act on the vertical bands when the air bag is inflated are distributed to the horizontal band so that the strength of the cover is great enough to withstand tensile forces which act on the coupling portions of the net.

16 Claims, 2 Drawing Sheets

COVER FOR AIR BAG UNIT

BACKGROUND OF THE INVENTION

1. Field of the Invention

The present invention relates to a cover for an air bag unit which is attached to a motor vehicle so as to house an air bag, which is inflated on a prescribed occasion.

2. Description of the Related Art

A conventional cover for an air bag unit is disclosed in the Japanese Utility Model Application (OPI) No. 44861/89 (the term "OPI" as used herein means an "unexamined published application"). The conventional cover is made of a softsynthetic resin, and includes an upper portion and a side portion. The upper portion covers an air bag, which is inflated on a prescribed occasion, and is broken when the air bag is inflated. The side portion extends downwardly from the peripheral edge of the upper portion. The cover has an insert embedded therein which includes a flexible net and a flexible reinforcing band assembly of high tensile strength.

The net includes a nearly-oblong annular side portion embedded in the side portion of the cover, upper portions embedded in the upper portion of the cover except in the breakable part of the upper portion of the cover, and coupling portions which couple the side portion of the net to the upper portion thereof. The net is embedded in the cover so that the upper portions of the net do not separate from the side portion thereof when the upper portion of the cover is broken due to inflation of the air bag.

The reinforcing band assembly includes a horizontal band secured to the side portion of the net along the entire perimeter of the side portion, and vertical bands secured to the side edge parts of the coupling portions of the net and to the horizontal band. The horizontal band is provided to prevent the side portion of the cover from expanding outward when the air bag is inflated. The vertical bands are provided to reinforce the coupling portions of the net and the side portions thereof under the coupling portions, because the coupling portions are forcefully pulled upwardly when the upper portion of the cover is broken and spreads due to the inflation of the air bag. To enhance the tensile strength of the coupling portions of the net and of the side portion thereof under the coupling portions, the vertical bands are long enough to extend down from the side edge parts of the coupling portions of the net to locations under the side portion of the net along the horizontal band and be secured at the lower ends of the vertical bands to the body of a steering wheel. Since the vertical bands, which are expensive are long, the cost of the material for the cover is high which presents a problem. In addition, the vertical bands need to be secured to the body of the steering wheel, and the area of the portions of the vertical bands which are sewn to the side portion of the net is large due to the large length of the vertical bands. Therefore, the number of manufacturing steps for the cover and the cost of manufacturing are high which is also a problem.

SUMMARY OF THE INVENTION

The present invention has the object of solving the above-mentioned problems with the conventional cover.

Accordingly, it is an object of the present invention to provide a cover for an air bag unit in which vertical bands and sewn portions are shortened without reducing the tensile strength of the coupling portions of a net and of the side portion under the coupling portions, which enable the coupling portions and the side portion to withstand stress well at the time of the inflation of an air bag, so that the cost of the material for the cover, the number of the steps for manufacturing the cover and the cost of manufacturing are minimized.

The cover of the invention is made of a soft synthetic resin, and includes an upper portion and a side portion extending downwardly from the peripheral edge of the upper portion. The upper portion of the cover covers the air bag, which is inflated on a prescribed occasion, and is broken when the air bag is inflated. An insert including the flexible net and a flexible reinforcing band assembly of high tensile strength is embedded in the cover, the net incudes an annular side portion embedded in the side portion of the cover, upper portions embedded in the upper portion of the cover except for the breakable part of the upper portion and the coupling portions coupling the side portion of the net to the upper portions thereof. The reinforcing band assembly includes a horizontal band sewn to the side portion of the net along the entire perimeter of the side portion of the net, and vertical bands sewn to the side edge parts of the coupling portions of the net and to the horizontal band. The cover is characterized in that the vertical bands of the reinforcing band assembly are bent back at the lower portions thereof so that the lower portions surround the horizontal band of the assembly; and the vertical bands, the horizontal band and the net are sewn to each other including the bent-back lower portions of the vertical bands.

When the air bag is inflated so that the upper portion of the cover is broken, the coupling portions of the net of the cover are pulled so that the vertical bands of the reinforcing band assembly are pulled upwardly and the horizontal band is pulled by the bent-back lower portions of the vertical bands. At that time, since the horizontal band is sewn to the side portion of the net along the entire perimeter of the side portion, the tensile forces which act to the vertical bands are distributed to the horizontal band so that the strength of the cover is great enough to withstand the tensile forces which act on the coupling portions of the net. For that reason, the vertical bands do not need to be made so long as to extend down from the side portion of the net and be secured to the body of a steering wheel as in the conventional cover. Rather, the vertical bands can have such a small length that the vertical bands simply have bent-back lower portions extending around the horizontal band. Since only the horizontal and the vertical bands and the side portion of the net are sewn to each other including the bent-back lower portions of the vertical bands, the sewing of the cover is minimized. The manufacturing steps and the cost of manufacturing are thus reduced.

Although the vertical bands of the conventional cover are sewn together with the net thereof to the horizontal band of the cover, the vertical bands do not surround the horizontal band but are only sewn thereto by sewing thread. When the conventional cover is broken due to the inflation of the air bag, the sewing thread is elongated so that the tensile forces which act on the vertical bands cannot be distributed to the horizontal band. In contrast, the vertical bands of the cover provided in accordance with the present invention are shortened without reducing the tensile strength of the coupling portions of the net and the side portion, which enables the coupling portions and the side portion to withstand the tensile forces which act to them when the air bag is inflated. In addition the vertical bands of the cover do not need to be secured to the body of the steering wheel. As a result, the cost of the material for the cover, the number of manufacturing steps and the cost of manufacturing are reduced.

Other objects, features, and characteristics of the present invention, as well as the method of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF EXEMPLARY EMBODIMENT

Figure 1:
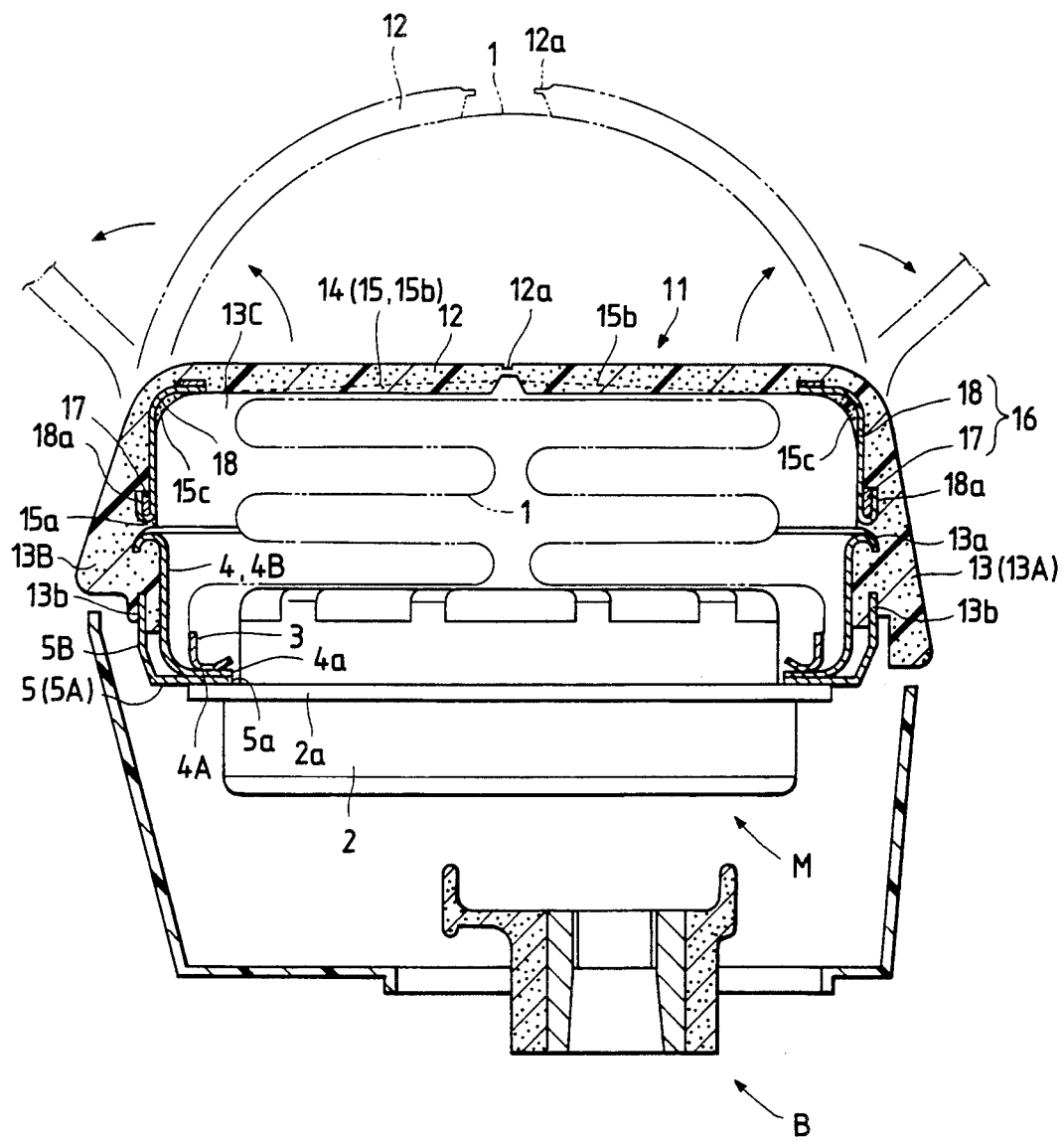
FIG. 1 is a sectional view of a cover provided in accordance with the present invention.
Figure 2:
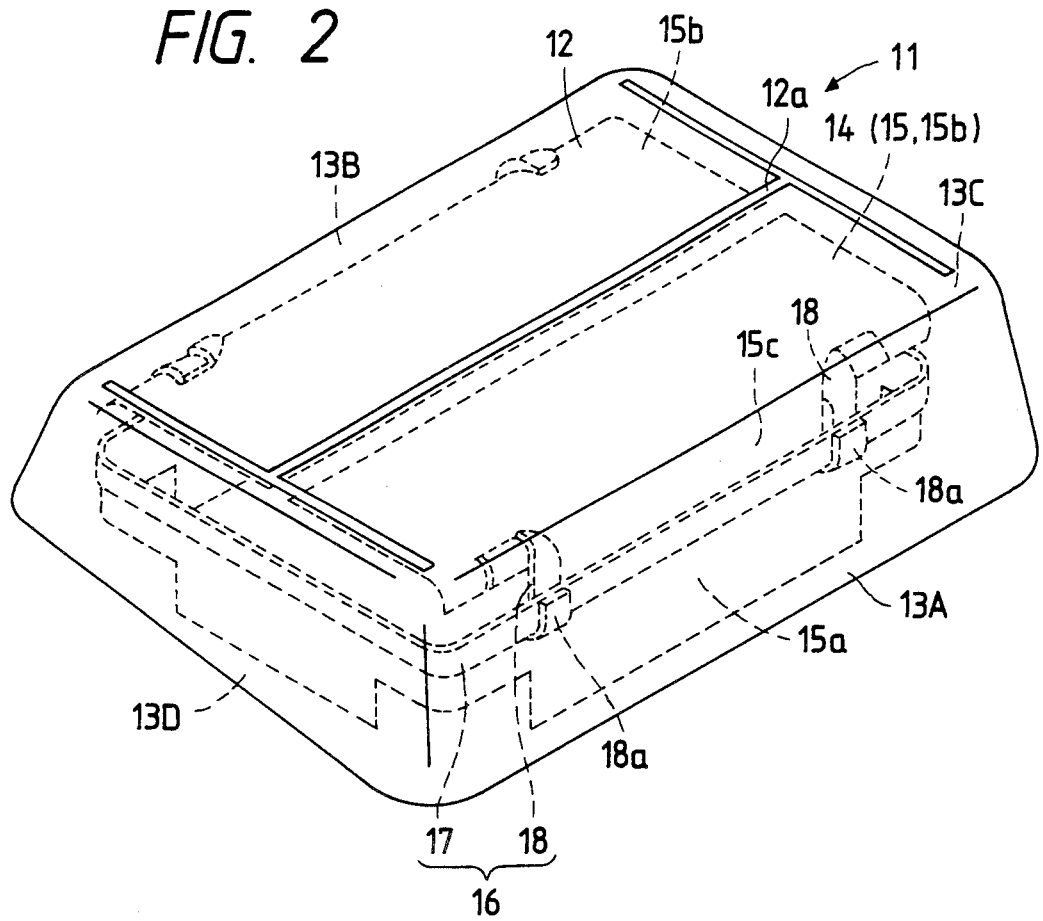
FIG. 2 is a perspective view of the cover.

FIGS. 1 and 2 show a cover 11 provided in accordance with the invention and which is for an air bag 1. The cover 11 is made of a soft synthetic resin such as urethane, and has an insert 14 embedded in the resin. The cover 11 is shaped like a box so as to cover the folded air bag 1, and includes an oblong upper portion 12 and a side portion 13 extending downwardly from the peripheral edge of the upper portion. The cover 11 is disposed over the boss B of a steering wheel. On a prescribed occasion, the air bag 1 is substantially spherically inflated by a gas supplied from an inflator 2. An annual metal fastener 3 is provided at the bottom of the air bag 1, and secured together with a support base 4 and a holder 5 to the flange 2a of the inflator 2 by bolts, rivets or the like (not shown).

The upper portion 12 of the cover 11 has breakable part 12a which is substantially I-shaped when viewed from above. As a result, the upper portion 12 can be easily broken when the air bag 1 is inflated. The side portion 13 of the cover 11 has an engagement groove 13a which is defined in the inside and along the entire perimeter thereof and has an arc-shaped cross section. The side portion 13 is composed of side parts 13A, 13B, 13C and 13D, each of which also has an engagement groove 13b extending vertically in the central portion of the side part from the bottom of the central portion. The support plate 4 and the holder 5 are fitted in the engagement grooves 13a and 13b, respectively, so that each of the side parts 13A, 13B, 13C and 13D of the side portion 13 is pinched between the support plate 4 and the holder 5. As a result, the cover 11 is fastened to the support plate 4.

The holder 5 is a metal plate to firmly hold the cover 11 on the support plate 4. The holder 5 includes a lower portion 5a which is substantially cross shaped when viewed from above, and four side portions 5B extending upwardly from the four outer edges of the lower portion and fitted in the engagement grooves 13b of the side parts 13A, 13B, 13C and 13D. Finally, the central part of the lower portion 5A has an insertion hole 5a into which the inflator 2 is inserted.

Figure 3:
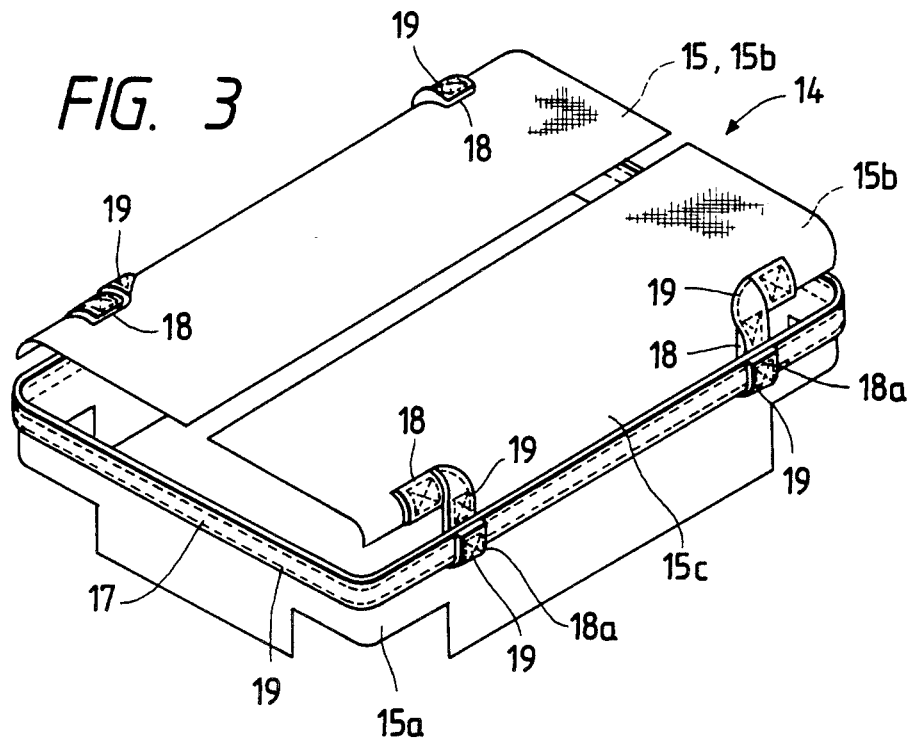
FIG. 3 is a perspective view of the insert for the cover.

The support plate 4 is a metal plate, and is substantially oblong dish-shaped. The support plate 4 includes a lower portion 4A which is oblong shaped when viewed from above, and four side portions 4B extending upwardly from the entire peripheral edge of the lower portion and fitted in the engagement grooves 13a of the side parts 13A, 13B, 13C and 13D. The central part of the lower portion 4A has a circular insertion hole 4a into which the inflator 2 is inserted. The peripheral part of the lower portion 4A of the support plate 4 is provided with a securing means such as puts (not shown) so that an air bag unit M including the air bag 1, the inflator 2, the metal fastener 3, the support plate 4, the holder 5 and the cover 11 are secured by the means over the boss B of the steering wheel. The insert 14, which is embedded in the cover 11, is composed of a net 15 woven from a spun yarn such as a nylon yarn, a polyester yarn and a cotton yarn, and a reinforcing band assembly 16 woven from aramid fibers or the like which are higher in tensile strength than the spun yarn. The net 15 is about 3 mm in the length of every side of each mesh thereof, and includes an oblong side portion 15a embedded in the entire side portion 13 of the cover 11, two upper portions 15b embedded in the upper portion 12 of the cover except in the breakable part 12a thereof, and coupling portions 15c which couple the sideportion 15a and the upper portions 15b, as shown in FIGS. 1, 2 and 3. The reinforcing band assembly 16 includes a horizontal band 17 sewn to the side portion 15a of the net 15 along the entire perimeter thereof by a sewing thread 19, such as a nylon thread, and vertical bands 18 sewn to the side edge parts of the coupling portions 15c of the net by sewing threads 19, such as nylon threads. Each of the vertical bands 18 is bent on the upper portion 15b of the net 15 at the upper portion of the vertical band and bent back around the horizontal band 17 at the lower portion of the vertical band. The vertical bands 18, the horizontal band 17 and the side portion 15a of the net 15 are sewn to each other, including the bent-back lower portions 18a of the vertical bands, with sewing threads 19.

When the cover 11 is to be manufactured, the vertical and the horizontal bands 18 and 17 of the reinforcing band assembly 16 are secured in prescribed positions to the net 15, the insert 14 thus composed of the net and the reinforcing band assembly is set in a prescribed die, and a prescribed molding material is poured into the die. The cover 11 is thus manufactured through molding.

The folded air bag 1 is secured to the inflator 2 and the support plate 4 by the metal fastener 3. The cover 11 is fastened to the support plate 4 by using the engagement groove 13a of the side portion 13 of the cover. The holder 5 is fitted in the engagement groove 13b of the side portion 13 of the cover 11 and secured to the support plate 4. The air bag unit M thus assembled is disposed with the securing means on the support plate 4 over the boss B of the steering wheel.

On the prescribed occasion after the disposition of the air bag unit M, the air bag 1 is inflated and the breakable part 12a of the upper portion 12 of the cover 11 is broken. As a result, the coupling portions 15c of the net 15 are pulled so that the vertical bands 18 of the reinforcing band assembly 16 are pulled upwardly. At that time, the horizontal band 17 of the band assembly 16 is pulled by the bent-back lower portions 18a of the vertical bands 18. Since the horizonal band 17 is sewn to the side portion 15a of the net 15 along the entire perimeter thereof, the tensile forces which act to the vertical bands 18 are distributed to the horizontal band so that the strength of the cover 11 is great enough to withstand the tensile forces which act on the coupling portions 15c of the net. For that reason, the vertical bands 18 do not need to be made so long as to extend down from the side portion 15a of the net 15 and be secured to the body of the steering wheel as in the conventional cover, but may be of such a small length that the vertical bands have the bent-back lower portions 18a simply extending around the horizontal band 17. Since only the horizontal and the vertical bands 17 and 18 and the side portion 15a of the net 15 are sewn to each other, including the bent-back lower portions 18a of the vertical bands, the sewing of the cover 11 is minimized. In addition, the vertical bands 18 do not need to be secured to the body of the steering wheel. The number of manufacturing steps for the cover 11 and the cost of manufacturing are thus reduced. If the reinforcing band assembly 16 is made of aramid fibers, the cost of the assembly is relatively high. However, the amount of aramid fibers required for the vertical bands 18 of the invention will be about 20% less than that required for the vertical bands of the reinforcing band assembly of the conventional cover, and the cost of the material for the insert 14 will be about 18% less than that for the insert of the conventional cover.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

For example, while in the illustrated embodiment each upper portion 15b of the net 15 is larger in length than each coupling portion 15c thereof, the upper portion may be equal in length to the coupling portion.

What is claimed is:

1. An insert for a cover for an air bag unit comprising:
   a flexible net including first and second upper portions, and a side portion; and
   a flexible reinforcing band assembly coupled to said flexible net, said reinforcing band assembly including a horizontal band element coupled to and extending along and about the entire side portion of said flexible net and plurality of vertical band elements, each said vertical band element having a first longitudinal end and a second longitudinal end, said first longitudinal end of each said vertical band being coupled to an upper portion end in adjacent to said side portion, said second longitudinal end of each said vertical band being bent back so as to surround said horizontal band, said horizontal band, said side portion of said net and said bent back portions of said vertical bands being coupled together.

2. An insert as in claim 1, wherein said net further comprises first and second coupling portions, each said coupling portion coupling said upper portion to said side portion.

3. An insert as in claim 2, wherein said vertical bands interconnect said side portion and said upper portion at said coupling portions.

4. An insert as in claim 3, wherein each said vertical band is coupled to said respective coupling portion.

5. An insert as in claim 1, wherein said horizontal bands are coupled to said flexible net by sewing.

6. An insert as in claim 1, wherein said vertical bands including said bent back portion are coupled to said horizontal band and to said net by sewing.

7. An insert as in claim 1, wherein said horizontal and vertical bands are formed from aramid fibers.

8. An insert as in claim 1, wherein said net is woven from a spun yarn selected from the group consisting of nylon yarn, polyester yarn, cotton yarn and combinations thereof.

9. An insert as in claim 1, wherein said net is woven from a spun yarn and said reinforcing band assembly is woven from fibers having a higher tensile strength than said spun yarn.

10. A cover for an air bag unit comprising:
    a cover upper portion for covering an air bag of said air bag unit and formed so as to be broken when the air bag is inflated;
    a cover side portion extending downwardly from a peripheral edge of said upper portion, and
    an insert embedded in said cover said insert including a flexible net including first and second upper portions, and a side portion; and a flexible reinforcing band assembly coupled to said flexible net, said reinforcing band assembly including a horizontal band element coupled to and extending along and about the entire side portion of said flexible net and plurality of vertical band elements, each said vertical band element having a first longitudinal end and a second longitudinal end, said first longitudinal end of each said vertical band being coupled to an upper portion end in adjacent to said side portion, said second longitudinal end of each said vertical band being bent back so as to surround said horizontal band, said horizontal band, said side portion of said net and said bent back portions of said vertical bands being coupled together.

11. A cover as in claim 10, wherein said cover is formed from a soft synthetic resin and said cover is molded in surrounding relation to said insert whereby said insert is embedded within the walls of said cover.

12. A cover as in claim 10, wherein said net further comprises first and second coupling portions, each said coupling portion coupling said upper portion to said side portion.

13. A cover as in claim 12, wherein said vertical bands interconnect said side portion and said upper portions at said coupling portions.

14. A cover as in claim 13, wherein each said vertical band is coupled to said respective coupling portion.

15. A cover as in claim 10, wherein said horizontal bands are coupled to said flexible net by sewing.

16. A cover as in claim 10, wherein said vertical bands including said bent back portions are coupled to said horizontal band and to said net by sewing.

* * * * *